United States Patent [19]

Shigaki et al.

[11] Patent Number: 5,008,742
[45] Date of Patent: Apr. 16, 1991

[54] DOT SIGNAL CONVERSION METHOD

[75] Inventors: Takao Shigaki; Osamu Shimazaki, both of Kaisei, Japan

[73] Assignee: Fuji Photo Film Co., Ltd., Kanagawa, Japan

[21] Appl. No.: 433,442

[22] Filed: Nov. 9, 1989

Related U.S. Application Data

[63] Continuation-in-part of Ser. No. 319,907, Mar. 6, 1989, abandoned, which is a continuation of Ser. No. 924,817, Oct. 30, 1986, abandoned.

[30] Foreign Application Priority Data

Nov. 9, 1985 [JP] Japan ................................ 60-251572

[51] Int. Cl.$^5$ ............................................. H04N 1/46
[52] U.S. Cl. ......................................... 358/79; 358/80; 358/75; 358/298
[58] Field of Search ........................ 358/75, 76, 79, 80, 358/298, 458, 459

[56] References Cited

U.S. PATENT DOCUMENTS 3,784,377  1/1974  Levy et al. ............................. 96/23
4,642,680  2/1987  Yamada ................................. 358/75
4,683,492  7/1987  Sugiura et al. ........................ 358/80

FOREIGN PATENT DOCUMENTS 58-175055  10/1983  Japan .

Primary Examiner—James J. Groody
Assistant Examiner—Kimyen Vu
Attorney, Agent, or Firm—Wenderoth, Lind & Ponack

[57] ABSTRACT

A dot signal conversion method includes the steps of reading a color original for color separation by an image input device and converting the thus formed density signals of respective colors into equivalent neutral density signals and then into dot signals. The dot signals are then fed into an image output device wherein wedges of respective colors are prepared. Dot signal generating tables are then prepared from the relationship between the visual density and dot percentage of each wedge in record and the equivalent neutral density signals are color-processed according to a predetermined formula and then converted into the dot signals by using the dot signal generating tables of respective colors.

5 Claims, 4 Drawing Sheets

PRIOR ART

FIG. 4A
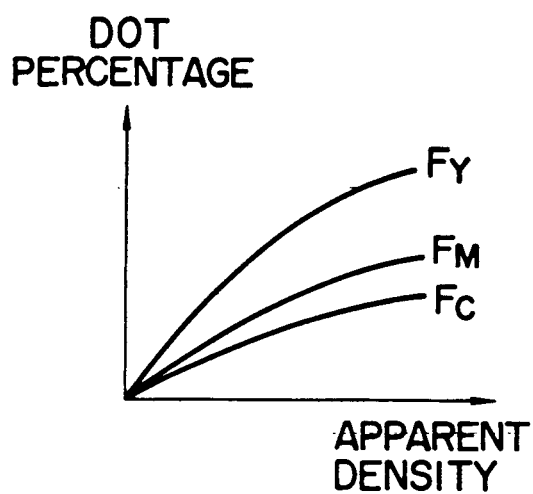
FIG. 4B
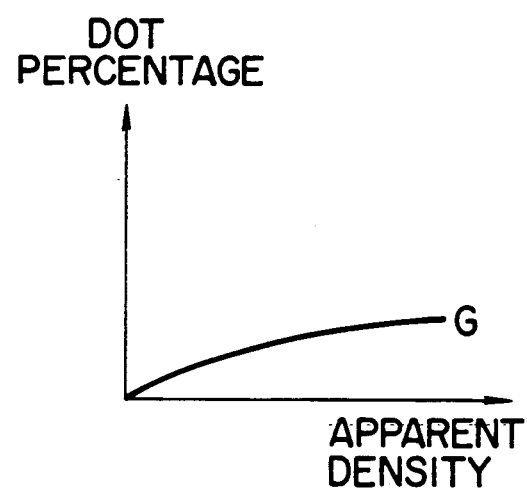
FIG. 5
|  | Y | M | C | BK |
|---|---|---|---|---|
| SHADOW | 90 | 90 | 95 | 80 |
| MIDDLE | 50 | 50 | 35 | 20 |
| HIGH-LIGHT | 3 | 3 | 5 | 0 |

DOT SIGNAL CONVERSION METHOD

This application is a continuation-in-part of now abandoned application, Ser. No. 07/319,907 filed on Mar. 6, 1989, which was a continuation of now abandoned application Ser. No. 06/924,817 filed on Oct. 30, 1986. Now abandoned.

BACKGROUND OF THE INVENTION

This invention relates to a dot signal conversion method which converts image signals of three primary colors into four color dot signals in a color image input/output system.

In a color image input/output system incorporating a lay-out scanner, a direct scanner, etc., a color manuscript is generally read out for color separation by a reading device, input density signals of the respective colors from the reading device are processed appropriately for colors, and then are converted into dot signals to be fed to an image output device.

FIG. 1 is a block diagram to show the processing flow from input image signals 1 (in three colors of Y (yellow), M (magenta) and C (cyan)) to dot signals 7. The minimum values, Min (Y, M, C) of the colors Y, M and C are obtained from the input image signals 1 by a minimum value selecting section 2 to be used in calculation by a dot coefficient calculating section 3 in accordance with equation (1) below.

$$U_R = (\text{Min}(Y, M, C) - TH_R)+ \qquad (1)$$

wherein $U_R$: dot coefficient

Min (Y, M, C): the minimum values of density for Y, M and C.

$TH_R$: starting point of calculation of dot intensity.

()+: positive numbers in the result of calculation.

The calculation result is fed to a dot calculating section 4 for respective colors together with the input image signals 1, and they are calculated according to equation (2) below.

$$\left. \begin{array}{l} Y' = Y - K_Y \cdot U_R \\ M' = M - K_M \cdot U_R \\ C' = C - K_C \cdot U_R \end{array} \right\} \qquad (2)$$

wherein

Y', M', C': dot signals $K_Y$, $K_M$, $K_C$: dot intensity (full black (ICR) when $0 \leq K \leq 1$, $K = (1)$.

The minimum density signals Min (Y, M, C) of respective colors obtained from the minimum value selecting section 2 are sent to a black print dot calculating section 5 for the calculation with the following equation (3).

$$B_K' = f(\text{Min}(Y, M, C)) \qquad (3)$$

wherein f: black print gradation table. Dot signals 7 are finally obtained in the four colors of Y', M', C' and $B_K$ (black).

When an operator runs the system having such a processing flow, he sets predetermined parameters $TH_R$, $K_Y$, $K_M$, $K_C$ and f, to obtain predetermined dot signals, or in other words, not to disturb the gray balance of the images. However, the number of parameters which should be set by the operator is large in this prior of method, and changes and adjustments among these parameters involve complicated operations. For instance, if one whishes to increase the percentage of black print ($B_K$) beyond the ordinary rate, one must change not only the black print gradation table but also $K_Y$, $K_M$ and $K_C$, and yet it is extremely difficult to change all of these parameters without disturbing gray balance unless the operator has considerable skill and experience.

SUMMARY OF THE INVENTION

This invention was contrived to obliterate these inconveniences encountered in the prior art and aims at providing a dot signal conversion method which does not disturb the gradation or gray balance as a whole no matter how black a print is selected.

According to one aspect of this invention, for achieving the objects described above, there is provided a dot signal conversion method of the steps of reading a color manuscript for color separation by an image input device, converting thus made density signals of respective colors into equivalent neutral density (END) signals and then into dot signals, and feeding the dot signals into an image output device which is characterized in that wedges of respective colors are prepared, dot signal generating tables are prepared from the relationship between the visual density and dot percentage of each wedge in record, and said equivalent neutral density (END) signals are color-processed according to a predetermined formula and then converted to said dot signals by using said dot signal generating tables of respective colors.

BRIEF DESCRIPTION OF THE DRAWINGS

In the accompanying drawings:

FIGS. 4A and 4B are graphs showing a dot signal generation table; and

FIG. 5 is a chart showing an example of dot percentages.

DETAILED DESCRIPTION OF THE INVENTION

Figure 1:
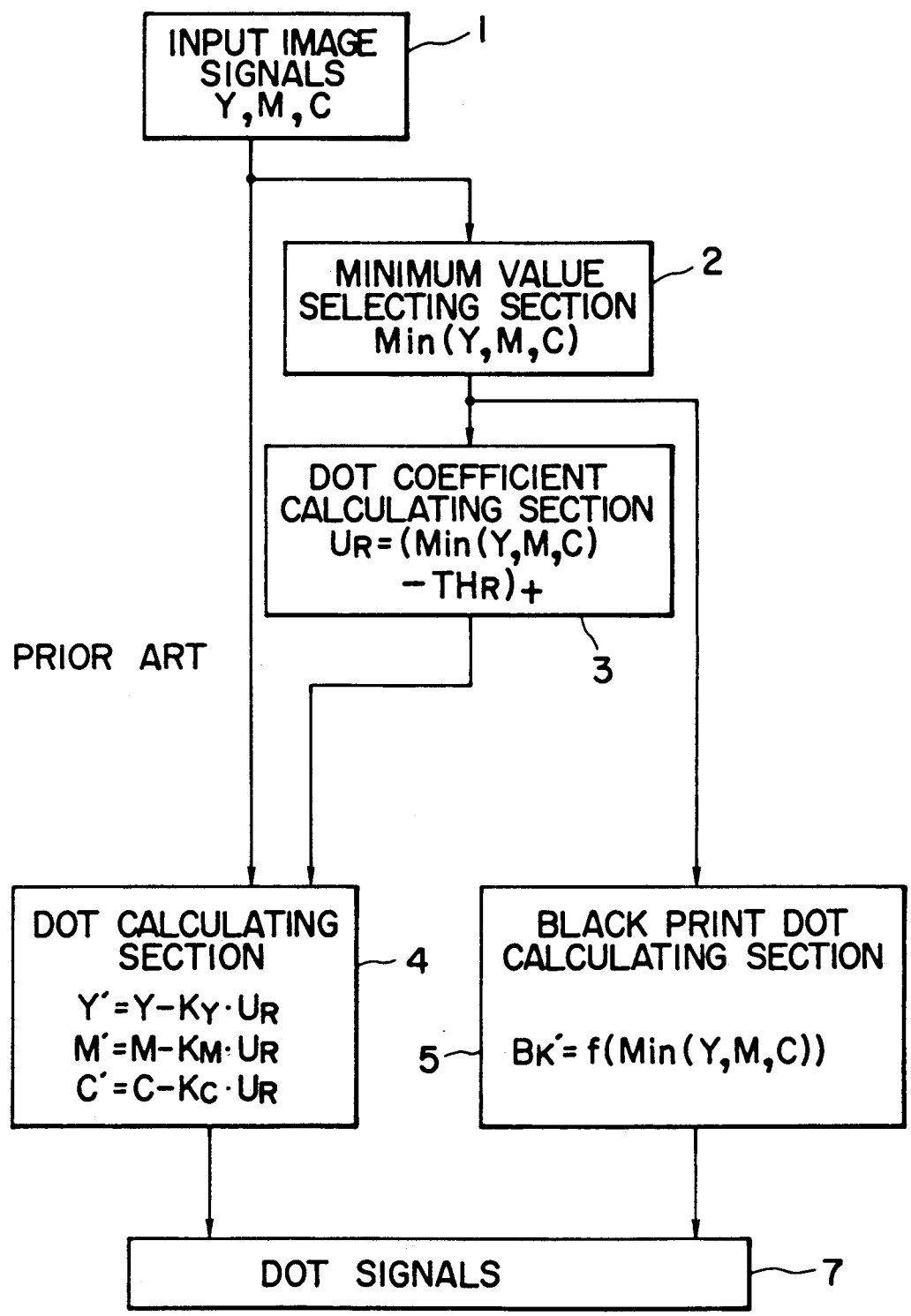
FIG. 1 is a block diagram to show a prior art image input/output system.
Figure 2:
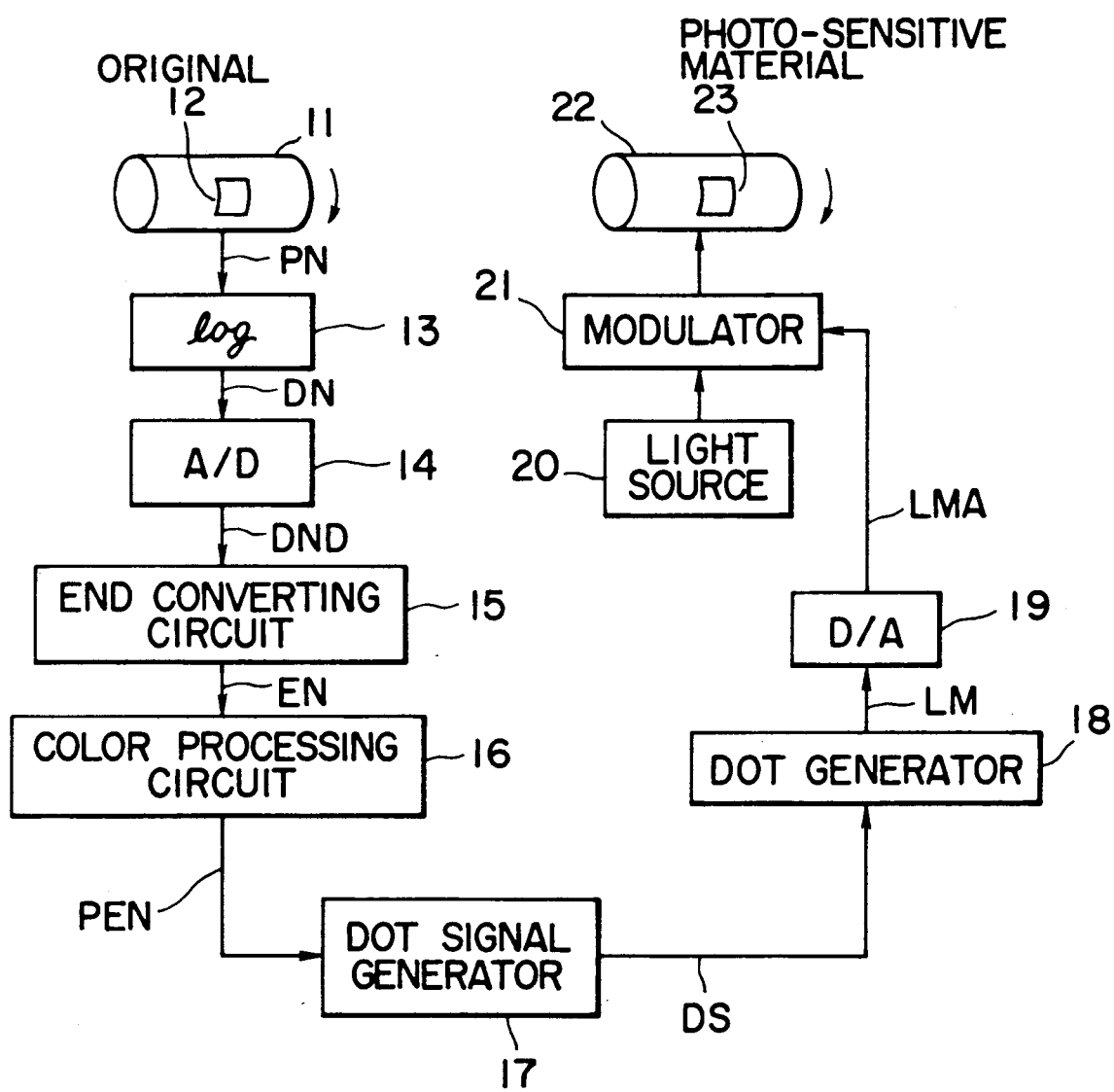
FIG. 2 is a block diagram of an enbodiment of the image input/output system which realizes this invention method.

FIG. 2 shows an image input/output system which generates dot signals according to an embodiment of this invention method. An original 12 placed on the surface of a rotating input drum 11 is scanned for color separation by an input optical head (not shown) having color separation filters, and image signals PN of respective colors are converted to electrical signals by a photoelectric converter to be fed to a logarithmic conversion circuit 13. The image signals PN are converted into density signals DN by the logarithmic conversion circuit 13, then converted into digital signals DN by an A/D converter 14, and inputted to an END (Equivalent Neutral Density) converting circuit 15, and digital density signals EN from the circuit 15 are fed to a color processing circuit 16. The color processing circuit 16 executes processings such as the color improvement processing which is disclosed in Japanese patent Laid Open No. 178355/1983, the sharpness enhancement processing which is disclosed in Japanese patent Laid Open No. 175055/1983 and other gradation conversion processing. The density signals PEN which have been color processed are outputted from the color processing circuit 16, and inputted to a dot signal generator 17, and converted into dot signals DS of four colors and inputted to a dot generator 18. They are converted by the dot generator 18 into light amount control signals LM for outputting dot patterns. The light amount control signals LM are converted into analog amouts LMA by a D/A converter 19, and inputted to a modulator 21 which modulates recording light from a light source 20 for exposure. The recording light which has been modulated by the light amount control signals LMA is outputted from an exposure head (not shown) to record the dot images on a photo-sensitive material 23 on a rotating output drum 22.

Figure 3:
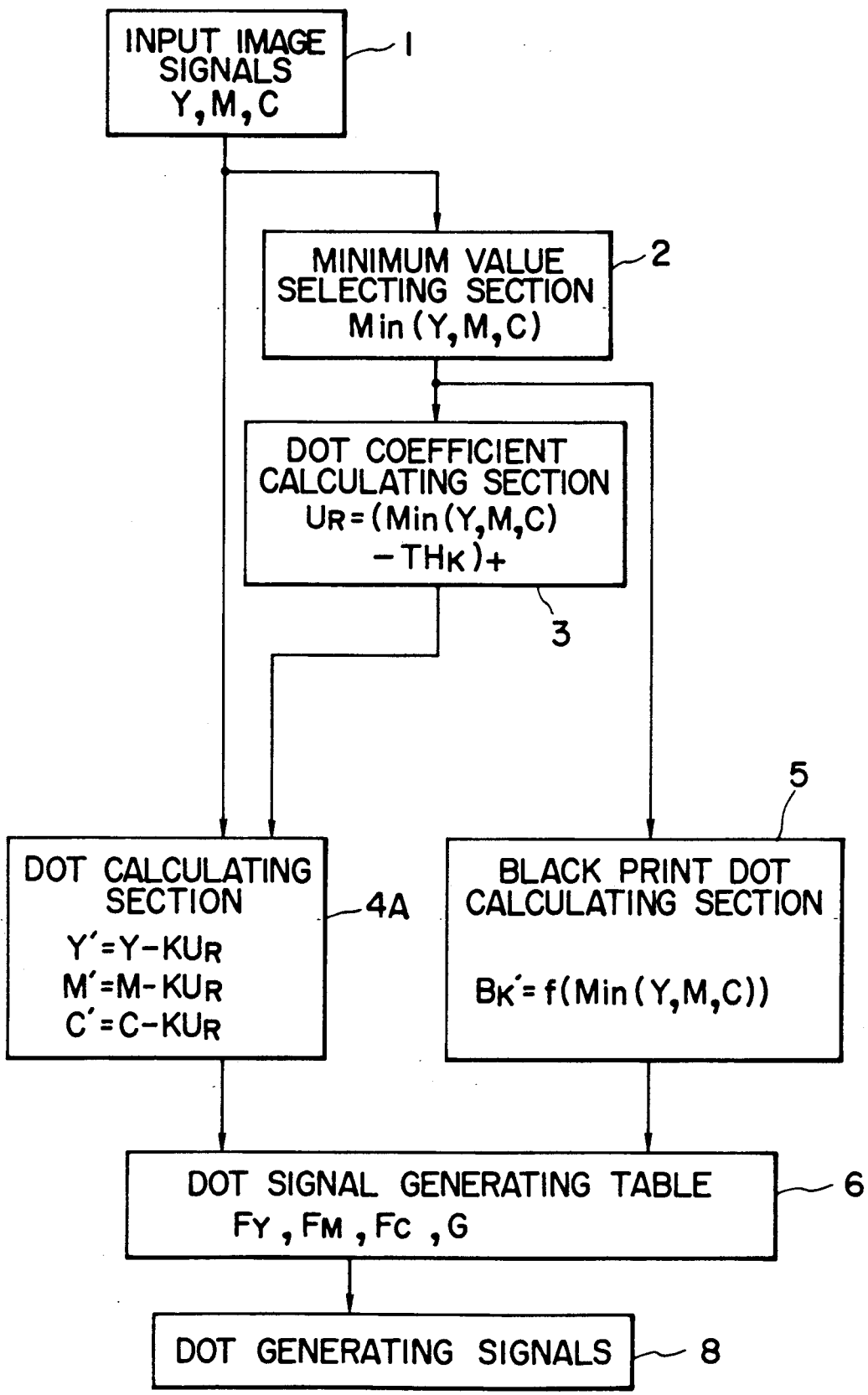
FIG. 3 is a block diagram showing an embodiment of the dot signal conversion method of this invention.

FIG. 3 shows the content of the dot signal generator 17 in a more detailed block diagram. The input image signals 1 are fed to the minimum value selecting section 2 for obtaining the minimum values for Y' (yellow), M (magenta) and C (cyan) respectively, then to the dot coefficient calculating section 3 to carry out the equation (1) mentiond above. The result of the calculation is fed to the dot calculating section 4A together with the input image signals 1. The dot calculating section 4A calculates in accordance with the equation (2) substituted as below:

$$K_Y = K_M = K_C = K \quad (4)$$

In other words, the equations (2A) will be used.

$$\left. \begin{array}{l} Y' = Y - K \cdot U_R \\ M' = M - K \cdot U_R \\ C' = C - K \cdot U_R \end{array} \right\} \quad (2A)$$

The minimum density signals MIN (Y, M, C) for respective colors obtained from the minimum value selecting section 2 are sent to the black print dot calculating section 5 to solve the equation (3). The dot signals Y', M', C' and $B_K'$ respectively are inputted into a dot signal generating table 6 to obtain the desired dot percentage. If it is assumed that the dot percentage of respective colors are %Y, %M, %C and %B, and the dot signal generating table 6 are $F_Y$, $F_M$, $F_C$ and G, dot generating signals 8 corresponding to the dot signals Y', M', C' and $B_K'$ will be calculated by the following equations.

$$\left. \begin{array}{l} \% Y = F_Y(Y') \\ \% M = F_M(M') \\ \% C = F_C(C') \\ \% B = F_B(B_K') \end{array} \right\} \quad (5)$$

FIGS. 4A and 4B are the graphs to illustrate a dot signal generating table 6 wherein the relationship between visual density and dot percentage is illustrated. Since these dot signal generating tables $F_Y$, $F_M$, $F_C$ and G will be determined automatically if the conditions for image output such as the type of printing ink or printing conditions are given, the wedges are obtained by changing the dot percentage for respective colors. The relationship between the dot percentage and the visual density on a recording material of the wedges is prepared as a data table as shown in FIG. 4A. A data table for the wedge of gray is obtained with a relationship as shown in FIG. 4B in a similar way. When an operator wishes to increase the ration of black print for an image larger than usual, he can do so by simply setting the apparent density at a slightly higher level. Since the same visual density is set at FIG. 4A simultaneously, a desired dot generaion will be easily realized without disturbing the gradation and gray balance of the whole image.

FIG. 5 shows an example of dot percentages of Y, M, C and $B_k$ when visual densities are roughly classified into shadow, middle and highlight. The table indicates that the relationship of the dot percentage will be automatically determined if the conditions such as ink or printing conditions are given as mentioned above. In other words, if one wishes to change the ratio of black print, it can be adjusted easily for each original by an operator by simply increasing/descreasing the black print gradation table f by using the black print dot calculating section 5. Any desired image output can be obtained simply by changing $F_y$, $F_m$ $F_c$ and G in FIGS. 4A and 4B.

As described in the foregoing, this invention dot signal conversion method conveniently allows unskilled operators to output final images in a desired manner quickly without disturbing the whole gradation tone and gray balance and without the necessity of complicated operation irrespective of the ratio of black print.

It should be understood that many modifications and adaptations of the invention will become apparent to those skilled in the art and it is intended to encompass such obvious modifications and changes in the scope of the claims appended hereto.

What is claimed is:

1. A dot signal conversion method comprising the steps of:

reading a color original for three color separation by an image input device to obtain density signals of respective colors;

converting the density signals of respective colors from the image input device into equivalent neutral density signals and then into dot signals, wherein said dot signals include dot percentages for color specimens, and wherein said neutral density signals are color-processed according to a predetermined formula and then converted to said dot signals by using dot signal generating tables, and feeding the dot signals into an image output device, said image output device having been used to prepare Y, M, C, and black color specimens in accordance with input test dot signals, whereby said Y, M, and C color specimens generate gray when the input dot signals are input to said output device so as to make color separation films Y, M and C of which dot percentages are changed, and Y, M and C printing plates are made based upon said color separation films and printing is performed by overlapping said Y, M and C printing plates, wherein said dot signal generating tables are prepared for each color Y, M, C, and black from the relationship between the visual density and dot percentage of each Y, M and black color specimen prepared in accordance with the input test dot signals.

2. A dot signal coversion method as claimed in claim 1, wherein said density signals are of the three colors of Y, M, and C.

3. A dot signal conversion method as claimed in claim 2, wherein said density signals of respective colors are inputted to a minimum value selecting section to select the minimum value, and the thus selected minimum value is inputted to a dot coefficient calculating section to obtain dot coefficients, and said density signals and dot coefficients are inputted to a dot calculating section to obtain dot signals for respective colors.

4. A dot signal conversion method as claimed in claim 3, wherein said minimum value is inputted to a black print dot calculating section to obtain black print dot signals.

5. A dot signal conversion method as claimed in claim 4, wherein said respective dot signal generating tables are prepared for each color Y, M, C and black based upon color specimens which are automatically determined when at least one of printing ink and printing conditions are given.

* * * * *